US009807452B2

(12) United States Patent
Freeman et al.

(10) Patent No.: US 9,807,452 B2
(45) Date of Patent: Oct. 31, 2017

(54) PRACTICAL DELIVERY OF HIGH QUALITY VIDEO USING DYNAMIC ADAPTIVE HYPERTEXT TRANSPORT PROTOCOL (HTTP) STREAMING (DASH) WITHOUT USING HTTP IN A BROADCAST NETWORK

(71) Applicant: Samsung Electronics Co., Ltd., Suwon-si, Gyeonggi-do (KR)

(72) Inventors: Martin Freeman, Palo Alto, CA (US); William Foote, Irvine, CA (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 14/507,746

(22) Filed: Oct. 6, 2014

(65) Prior Publication Data
US 2015/0100996 A1 Apr. 9, 2015

Related U.S. Application Data

(60) Provisional application No. 61/887,846, filed on Oct. 7, 2013.

(51) Int. Cl.
*H04N 21/4385* (2011.01)
*H04N 21/239* (2011.01)
(Continued)

(52) U.S. Cl.
CPC ..... *H04N 21/4385* (2013.01); *H04N 21/2381* (2013.01); *H04N 21/26258* (2013.01);
(Continued)

(58) Field of Classification Search
CPC ......... H04N 21/8456; H04N 21/23459; H04N 21/44004; H04N 21/44008; H04N 21/43; H04N 21/84; H04N 21/835
See application file for complete search history.

(56) References Cited

U.S. PATENT DOCUMENTS 8,914,835 B2 * 12/2014 Chen ................ H04N 21/23439
709/231
9,386,125 B2 * 7/2016 Bae ......................... H04L 69/04
(Continued)

FOREIGN PATENT DOCUMENTS

| EP | 2596615 A2 | 5/2013 |
|---|---|---|
| WO | 2012011746 A2 | 1/2012 |
| WO | 2012134530 A1 | 10/2012 |

OTHER PUBLICATIONS

Kim, C-S., "A study on Dynamic Adaptive Streaming System over HPPT for Various Streaming Services", International Journal of Future Generation Communication and Networking, Sep. 2012, Department of Multimedia Engineering, College of Engineering, Hannam University and Department of Computer Engineering, College of Engineering, Paichai University, Korea pp. 1-10, vol. , No. 3, Korea.
(Continued)

*Primary Examiner* — Robert Hance
*Assistant Examiner* — Susan X Li
(74) *Attorney, Agent, or Firm* — Sherman IP LLP; Kenneth L. Sherman; Hemavathy Perumal

(57) ABSTRACT

A method for content delivery using dynamic adaptive hypertext transport protocol (HTTP) streaming (DASH) without using HTTP. The method includes receiving a media presentation description (MPD) file and one or more DASH segments by a client device. Information in the MPD file is used to filter the one or more DASH segments. The filtered DASH segments are stored in a segments buffer. Particular DASH segments are requested from the segments buffer by the client device based on the information.

30 Claims, 13 Drawing Sheets

(51) Int. Cl.
*H04N 21/2381* (2011.01)
*H04N 21/262* (2011.01)
*H04N 21/438* (2011.01)
*H04N 21/462* (2011.01)
*H04N 21/845* (2011.01)
*H04N 21/854* (2011.01)

(52) U.S. Cl.
CPC ..... H04N 21/4381 (2013.01); H04N 21/4622 (2013.01); H04N 21/8455 (2013.01); H04N 21/8456 (2013.01); H04N 21/85406 (2013.01); *H04N 21/2393* (2013.01)

(56) References Cited

U.S. PATENT DOCUMENTS

| | | |
|---|---|---|
| 2012/0023254 A1 | 1/2012 | Park et al. |
| 2012/0124179 A1 | 5/2012 | Cappio et al. |
| 2012/0209952 A1 | 8/2012 | Lotfallah et al. |
| 2012/0259994 A1* | 10/2012 | Gillies ................ H04L 12/1881 709/231 |
| 2013/0007814 A1 | 1/2013 | Cherian et al. |
| 2013/0036234 A1 | 2/2013 | Pazos et al. |
| 2013/0091251 A1 | 4/2013 | Walker et al. |
| 2013/0182643 A1 | 7/2013 | Pazos et al. |
| 2013/0195204 A1* | 8/2013 | Reznik ................ H04N 19/85 375/240.26 |
| 2013/0268577 A1* | 10/2013 | Oyman ................ H04N 13/00 709/203 |
| 2013/0268761 A1 | 10/2013 | Giladi |
| 2013/0276035 A1 | 10/2013 | Walker et al. |
| 2013/0298177 A1* | 11/2013 | Rhyu ................ H04N 21/643 725/110 |
| 2014/0019635 A1* | 1/2014 | Reznik ................ H04L 65/607 709/231 |
| 2014/0020111 A1* | 1/2014 | Wang ................ G06F 21/10 726/26 |
| 2014/0133489 A1* | 5/2014 | Bae ................ H04L 69/04 370/392 |
| 2014/0245359 A1* | 8/2014 | De Foy ................ H04N 21/6181 725/62 |
| 2014/0282792 A1* | 9/2014 | Bao ................ H04N 21/44004 725/116 |
| 2014/0313916 A1* | 10/2014 | Hwang ................ H04N 21/236 370/252 |
| 2014/0317476 A1* | 10/2014 | Hwang ................ H04L 1/0041 714/776 |
| 2014/0317664 A1* | 10/2014 | Park ................ H04N 21/23614 725/109 |
| 2014/0317674 A1* | 10/2014 | Hwang ................ H04N 21/2362 725/118 |
| 2014/0325572 A1* | 10/2014 | Yie ................ H04H 60/73 725/74 |
| 2014/0334504 A1* | 11/2014 | Yie ................ H04H 20/18 370/474 |
| 2014/0344470 A1* | 11/2014 | Lee ................ H04N 21/236 709/231 |
| 2015/0012956 A1* | 1/2015 | Kim ................ H04N 21/2381 725/110 |
| 2015/0032845 A1* | 1/2015 | Bouazizi ................ H04L 67/06 709/217 |
| 2015/0100996 A1* | 4/2015 | Freeman ................ H04N 21/4385 725/110 |
| 2015/0106862 A1* | 4/2015 | Watanabe ................ H04N 21/6332 725/116 |
| 2015/0189337 A1* | 7/2015 | Pedan ................ H04N 21/23605 370/474 |
| 2015/0215369 A1* | 7/2015 | Yamagishi ................ G06F 13/00 709/219 |
| 2015/0229676 A1* | 8/2015 | Bouazizi ................ H04L 65/4084 709/231 |
| 2015/0281799 A1* | 10/2015 | Lim ................ H04N 21/631 725/110 |
| 2015/0334152 A1* | 11/2015 | Oyman ................ H04W 52/0251 709/219 |
| 2016/0006784 A1* | 1/2016 | Lee ................ H04L 69/04 370/474 |
| 2016/0234532 A1* | 8/2016 | Lee ................ H04N 21/2347 |

OTHER PUBLICATIONS

International Search Report and Written Opinion dated Jan. 5, 2015 for International Application No. PCT/KR2014/009422 from Korean Intellectual Property Office, pp. 1-10, Daejeon, Republic of Korea.

Extended European Search Report dated May 4, 2017 for European Application No. 14852565.2 from European Patent Office, pp. 1-10, Munich, Germany.

Yongkwon, L. et al,, "Client operation for DASH service delivered through MMT Protocol", Proceedings in the 2014 International Organisation for Standardisation for Coding of Moving Pictures and Audio, Jul. 7, 2014, pp. 1-3, Samsung Electronics, Sapporo, Japan.

International Orgianization for Statndarization (ISO) and International Electrotechnical Commision (IEC), "Information technology-High efficiency coding and media delivery in heterogeneous environments—Part 13: MMT implementation guidelines", Jan. 1, 2013, pp. 1-22, Geneva.

Stockhammer, T. et al., "Dash in Mobile Networks and Services", Proceedings of the 2012 Visual Communications and Image Processing (VCIP), Nov. 27-30, 2012, pp. 1-6, IEEE, United States.

Bouazizi, I. et al., "Proposed changes to MMTP and Payload Format", International Organisation for Standardisation for Coding of Moving Pictures and Audio, Jul. 29, 2013, pp. 1-18, Vienna, Austria.

International Orgianization for Statndarization (ISO) and International Electrotechnical Commision (EIC), "Inforrnation technology-High efficiency coding and media delivery in heterogeneous environments—Part 1: MPEG media transport (MMT)", Apr. 26, 2013, pp. 1-92, Geneva.

International Orgianization for Statndarization (ISO) and International Electrotechnical Commision (IEC), "Study of ISO/IEC PDTR 23008-13 MPEG Media Transport Implementation Guidelines", 109. MPEG Meeting, Jul. 7, 2014—Jul. 11, 2014, Sapporo, (Motion Picture Expert Group or ISO/IEC JTC1/SC29/WG11), Oct. 3, 2014, pp. 1-54, No. N14643, XP030021381, Geneva.

* cited by examiner

PRACTICAL DELIVERY OF HIGH QUALITY VIDEO USING DYNAMIC ADAPTIVE HYPERTEXT TRANSPORT PROTOCOL (HTTP) STREAMING (DASH) WITHOUT USING HTTP IN A BROADCAST NETWORK

CROSS-REFERENCE TO RELATED APPLICATIONS

This application claims the priority benefit of U.S. Provisional Patent Application Ser. No. 61/887,846, filed Oct. 7, 2013, incorporated herein by reference in its entirety.

TECHNICAL FIELD

One or more embodiments relate generally to obtaining content and, in particular, to delivery of video content using dynamic adaptive hypertext transport protocol (HTTP) streaming (DASH) without using HTTP in a broadcast network.

BACKGROUND

Transmission Control Protocol (TCP) has been considered as unsuitable for the delivery of real-time media, such as audio and video content. This is mainly due to the aggressive congestion control algorithm and the retransmission procedure that TCP implements. In TCP, the sender reduces the transmission rate significantly (e.g., by 50%) upon detection of a congestion event, typically recognized through packet loss or excessive transmission delays.

Hypertext Transport Protocol (HTTP) is a preferred protocol for the delivery of multimedia content over the Internet. HTTP runs on top of TCP and is a textual protocol.

Dynamic Adaptive HTTP Streaming (DASH) has been standardized by the 3rd Generation Partnership Project (3GPP) and Motion Pictures Expert Group (MPEG). Several other proprietary solutions for adaptive HTTP streaming, such as APPLE's HTTP Live Streaming (HLS) and MICROSOFT's Smooth Streaming, are being commercially deployed. Unlike those, however, DASH is a fully-open and standardized media streaming solution, which drives interoperability among different implementations.

SUMMARY

In one embodiment, a method provides for content delivery using dynamic adaptive hypertext transport protocol (HTTP) streaming (DASH) without using HTTP. One embodiment includes receiving a media presentation description (MPD) file and one or more DASH segments by a client device. In one embodiment, information in the MPD file is used to filter the one or more DASH segments. The filtered DASH segments are stored in a segments buffer. In one embodiment, particular DASH segments are requested from the segments buffer by the client device based on the information.

One embodiment provides a client device for content delivery using DASH without using HTTP. The client device includes a segments buffer and a DASH processing component that receives a MPD file and one or more DASH segments. The DASH processing component further filters the one or more DASH segments using information from the MPD file, stores the filtered one or more DASH segments in the segments buffer and requests one or more particular DASH segments from the segments buffer based on the information for presenting content.

Another embodiment provides a non-transitory computer-readable medium having instructions which when executed on a computer perform a method for content delivery using DASH without using HTTP. In one embodiment, the method comprises receiving an MPD file and one or more DASH segments by a client device. In one embodiment, information in the MPD file is used to filter the one or more DASH segments. In one embodiment, the filtered one or more DASH segments are stored in a segments buffer. In one embodiment, one or more particular DASH segments are requested from the segments buffer by the client device based on the information.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
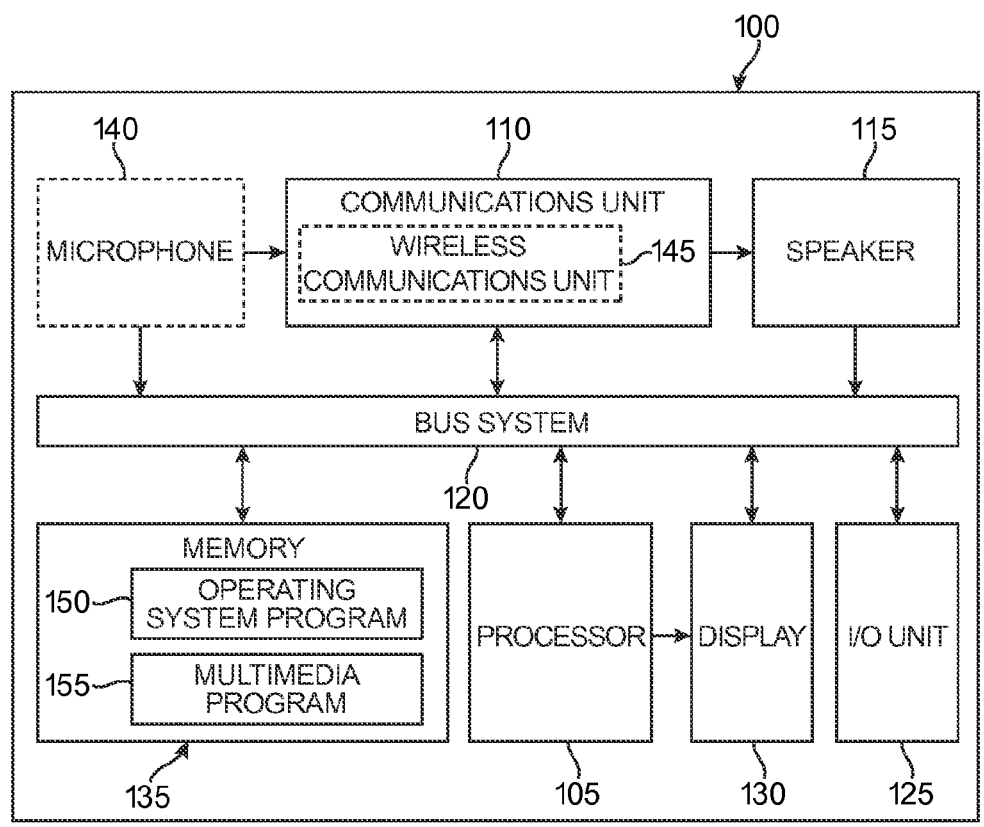
FIG. 1 illustrates an example client device, according to one embodiment.

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to delivery of video content using dynamic adaptive hypertext transport protocol (HTTP) streaming (DASH) with the content segments delivered over MMTP instead of HTTP in a broadcast network. In one embodiment, a method includes receiving a media presentation description (MPD) file and one or more DASH segments by a client device. In one embodiment, information in the MPD file is used to filter the one or more DASH segments. The filtered DASH segments are stored in a segments buffer. In one embodiment, particular DASH segments are requested from the segments buffer by the client device based on the information.

One embodiment provides a client device for content delivery using DASH without using HTTP. The client device includes a segments buffer and a DASH processing component that receives a MPD file and one or more DASH segments. The DASH processing component further filters the one or more DASH segments using information from the MPD file, stores the filtered one or more DASH segments in the segments buffer and requests one or more particular DASH segments from the segments buffer based on the information for presenting content.

One or more embodiments employ DASH for broadcast without HTTP. In one embodiment, the client devices are not HTTP client devices and a broadcast system does not employ an HTTP server. In one embodiment, a broadcast server delivers an MPD file MPD and DASH segments to the broadcast client. The broadcast client delivers the DASH segments to a broadcast DASH buffer. In one embodiment, the MPD file is used to filter DASH segments (e.g., based on uniform resource locator (URL)). In one embodiment, the broadcast DASH buffer stores the DASH segments with the associated URL. The broadcast DASH client device finds segments based on the URL in the broadcast DASH buffer. In one embodiment, if a DASH segment at the desired quality level is not found, the DASH segment at the next lower quality level may be found (if available) by modifying the URL as per the DASH specification.

DASH refers to a typical scheme of adaptive streaming, which changes server-controlled adaptive streaming to client-controlled adaptive streaming. In server-controlled adaptive streaming, a server device has information about its connections to all connected client devices and generates what each client requires, for transmitting optimal content for each network situation. The server device, however, may become overloaded as the client devices increase in number. In DASH, the server device generates media segments and metadata in advance for several possible cases, and the client devices request and play content depending on the situation. This makes it possible to download and play the optimal content depending on the network conditions while reducing the load placed on the server device.

Examples of content may include audio information, video information, audio-video information, and data. Content items may include multiple components, such as audio information, video information, and subtitle information. For example, a component may be a subtitle stream composed in a particular language or a video stream obtained at a certain camera angle. The component may include a track, an elementary stream (ES), etc., depending on its container. Content resources refer to content items (such as various qualities, bit rates, and angles) that are provided in multiple representations to enable adaptive streaming for content items. A service discovery process may be referred to as content resources. The content resources may include one or more consecutive time periods, which comprise a temporal section of content resources.

Representations refer to versions (for all or some components) of content resources in a period. Representations may be different in a subset of components or in encoding parameters (such as bit rate) for components. Although representations are referred to as media data, they may also be referred to as any such terms indicating data, including one or more components, without being limited thereto. A segment or DASH segment refers to a temporal section of representations, which is named by a unique URL in a particular system layer type (such as Transport Stream (TS) or Moving Picture Experts Group (MPEG)-4 (MP4) Part 14).

FIG. 1 illustrates an example client device 100 according to one embodiment. In one embodiment, the client device 100 may be a device for generating and/or receiving anchored location information about multimedia content streamed over a network. In one embodiment, the client device 100 represents any suitable fixed, mobile or portable device for receiving content. In one embodiment, the client device 100 may comprise electronic devices that may include television devices, smart television devices, mobile television devices, devices capable of data communication over a communication link such as a wireless communication link, mobile computing devices, electronic computing tablet devices, etc. In one embodiment, a mobile device includes a mobile phone or smart phone device, a mobile tablet device, a wearable device, a mobile computing device, a media player, an audio player (such as an MP3 player or radio), or any other device suitable for receiving streamed content, etc.

In one embodiment, the client device 100 includes a processor 105, a communications unit 110, one or more speakers 115, a bus system 120, an input/output (I/O) unit 125, a display 130, and a memory 135. The client device 100 may also include one or more microphones 140. In one embodiment, the communications unit 110 may include a wireless communications unit 145. The memory 135 includes an operating system (OS) program 150 and at least one multimedia program 155. In one embodiment, the client device may include one or more sensors, such as lighting sensors, temperature sensors, locating sensors (e.g., global positioning system (GPS), one or more cameras, etc.

In one embodiment, the communications unit 110 provides for communications with other systems or devices over a network. For example, the communications unit 110 may include a network interface card or a wireless transceiver. The communications unit 110 may provide communications through wired, optical, wireless, or other communication links to a network.

In one or more embodiments, the client device 100 is capable of receiving information over a wireless network. For example, the communications unit 110 may include the wireless communications unit 145. The wireless communications unit 145 may include an antenna, radio frequency (RF) transceiver, and processing circuitry. The RF transceiver may receive via the antenna an incoming RF signal transmitted by a base station, eNodeB, or access point of a wireless network. The RF transceiver down-converts the incoming RF signal to produce an intermediate frequency (IF) or baseband signal. The IF or baseband signal is sent to receiver (RX) processing circuitry, which produces a processed baseband signal by filtering, digitizing, demodulation, and/or decoding operations. The RX processing circuitry transmits the processed baseband signal to the speaker(s) 115 (such as for audio data) or to the processor 105 for further processing (such as for video data and audio data processing).

The wireless communications unit 145 may also include transmitter (TX) processing circuitry that receives analog or digital voice data from the microphone(s) 140 or other outgoing baseband data (such as web data, e-mail, or generated location information) from the processor 105. The transmitter processing circuitry may encode, modulate, multiplex, and/or digitize the outgoing baseband data to produce a processed baseband or IF signal. The RF transceiver may receive the outgoing baseband or intermediate frequency (IF) signal from the transmitter processing circuitry and up-convert the baseband or IF signal to an RF signal that is transmitted via the antenna.

The processor 105 processes instructions that may be loaded into the memory 135. The processor 105 may include a number of processors, a multi-processor core, or other type(s) of processing device(s) depending on the particular implementation. In some embodiments, the processor 105 may be or include one or more graphics processors for processing and rendering graphical and/or video data for presentation by the display 130. In one or more embodiments, the processor 105 may comprise a microprocessor or microcontroller. In one embodiment, the memory 135 is connected to the processor 105. Part of the memory 135 may include a random access memory (RAM), and another part of the memory 135 may include a non-volatile memory such as a Flash memory, an optical disk, a rewritable magnetic tape, or any other type of persistent storage.

In one embodiment, the processor 105 executes the OS program 150 stored in the memory 135 in order to control the overall operation of the client device 100. In one or more embodiments, the processor 105 controls the reception of forward channel signals and the transmission of reverse channel signals by the wireless communications unit 145.

In one embodiment, the processor 105 is capable of executing other processes and programs resident in the memory 135, such as the multimedia program 155. The processor 105 may move data into or out of the memory 135 as required by an executing process. The processor 105 is also connected to the I/O interface 125. The I/O interface 125 provides for input and output of data using other devices that may be connected to the client device 100. For example, the I/O unit 125 may provide a connection for user input through a keyboard, a mouse, voice control, remote control, or other suitable input device. The I/O unit 125 may also send output to a display, printer, or other suitable output device.

The display 130 provides a mechanism to visually present information to a user. In one embodiment, the display 130 may be a liquid crystal display (LCD), light emitting diode (LED), organic LED (OLED) or other display capable of rendering text and/or graphics. The display 130 may also be one or more display lights indicating information to a user. In one or more embodiments, the display 130 is a touch screen that allows user inputs to be received and interpreted by the client device 100. The multimedia program 155 is stored in the memory 135 and executable by the processor 105.

Figure 2:
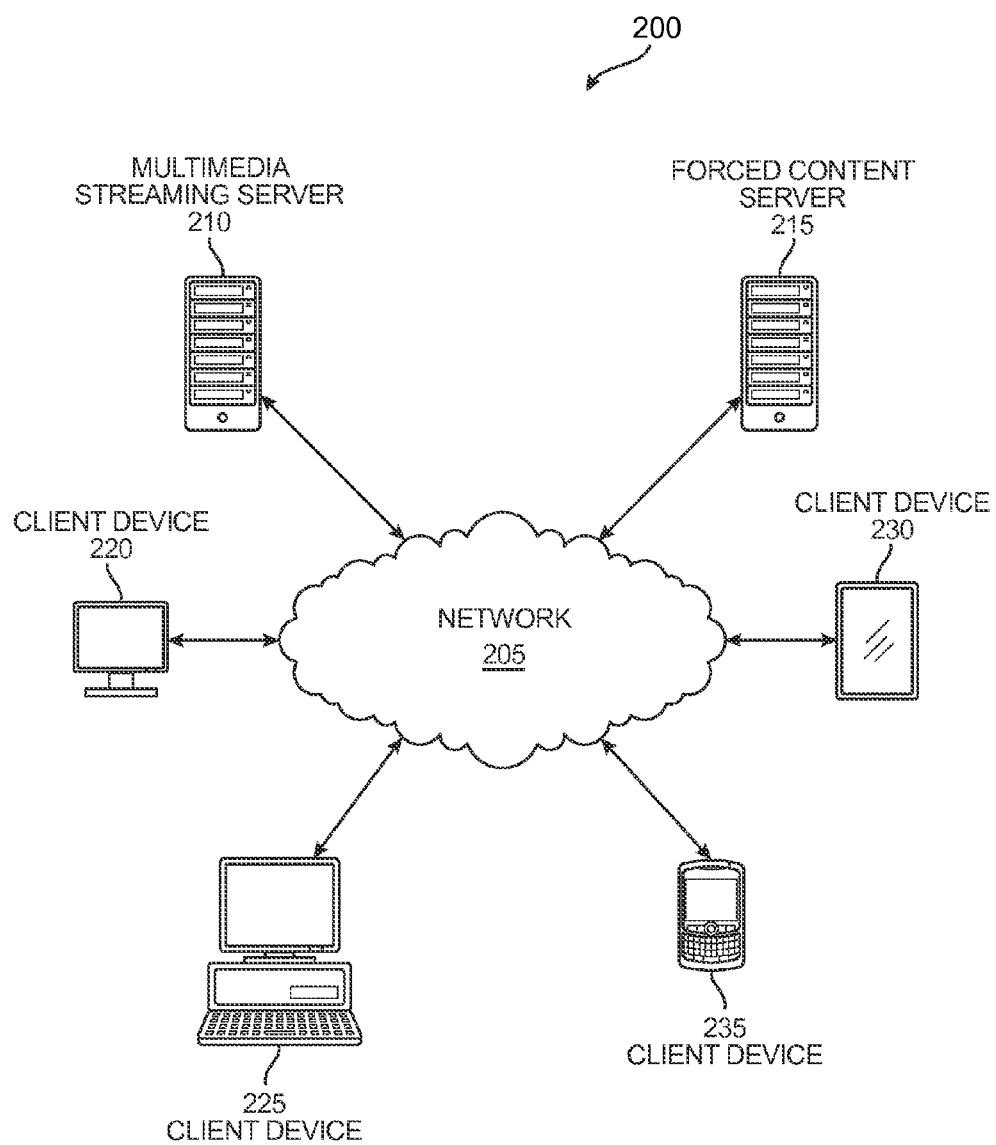
FIG. 2 illustrates an example networked system for streaming multimedia content, according to one embodiment.

FIG. 2 illustrates an example networked system 200 for streaming multimedia content according to one embodiment. In one embodiment, the system 200 includes a network 205, which provides communication links between various computers and other devices. The network 205 may include any suitable connections, such as wired, wireless, or fiber optic links. In one or more embodiments, the network 205 represents at least a portion of the Internet and may include a worldwide collection of networks and gateways that use the Transmission Control Protocol/Internet Protocol (TCP/IP) suite of protocols to communicate with one another. However, any other public and/or private network(s) may be used in the system 200. In one embodiment, the system 200 may be implemented using a number of different types of networks, such as an intranet, a local area network (LAN), a wide area network (WAN), a cloud computing network, etc.

Server computers 210-215 and client devices 220-235 connect to the network 205. Each of the client devices 220-235 may, for example, represent the client device 100 in FIG. 1. The client devices 220-235 are clients to the server computers 210-215 in this example. In one embodiment, the system 200 may include additional server computers, client devices, or other devices. In one embodiment, the server 210 represents a multimedia streaming server, while the server 215 represents a content server that can play content, such as advertisements.

In one or more embodiments, the network 205 includes a wireless network of base stations, eNodeBs, access points, or other components that provide wireless broadband access to the network 205 and the client devices 220-235 within a wireless coverage area. In one or more embodiments, base stations or eNodeBs in the network 205 may communicate with each other and with the client devices 220-235 using orthogonal frequency-division multiplexing (OFDM) or OFDM access (OFDMA) techniques.

In one embodiment, the client devices 220-235 receive streamed multimedia content from the multimedia streaming server 210. In one or more embodiments, the client devices 220-235 receive the multimedia content using DASH segments delivered through MMTP. In other embodiments, the client devices 220-235 may receive multimedia content using the real-time streaming protocol (RTSP), the real-time transport protocol (RTP), the HTTP adaptive streaming (HAS) protocol, the HTTP live streaming (HLS) protocol, smooth streaming, and/or other type of standard for streaming content over a network.

It should be noted that the illustrations of the client device 100 in FIG. 1 and the networked system 200 in FIG. 2 are not meant to imply physical or architectural limitations on the manner in which the embodiments may be implemented. Various components in each figure may be combined, further subdivided, or omitted and additional components could be added according to particular needs. Also, client devices and networks may come in a wide variety of forms and configurations, and FIGS. 1 and 2 do not limit the scope of the embodiments to any particular implementation.

Figure 3:
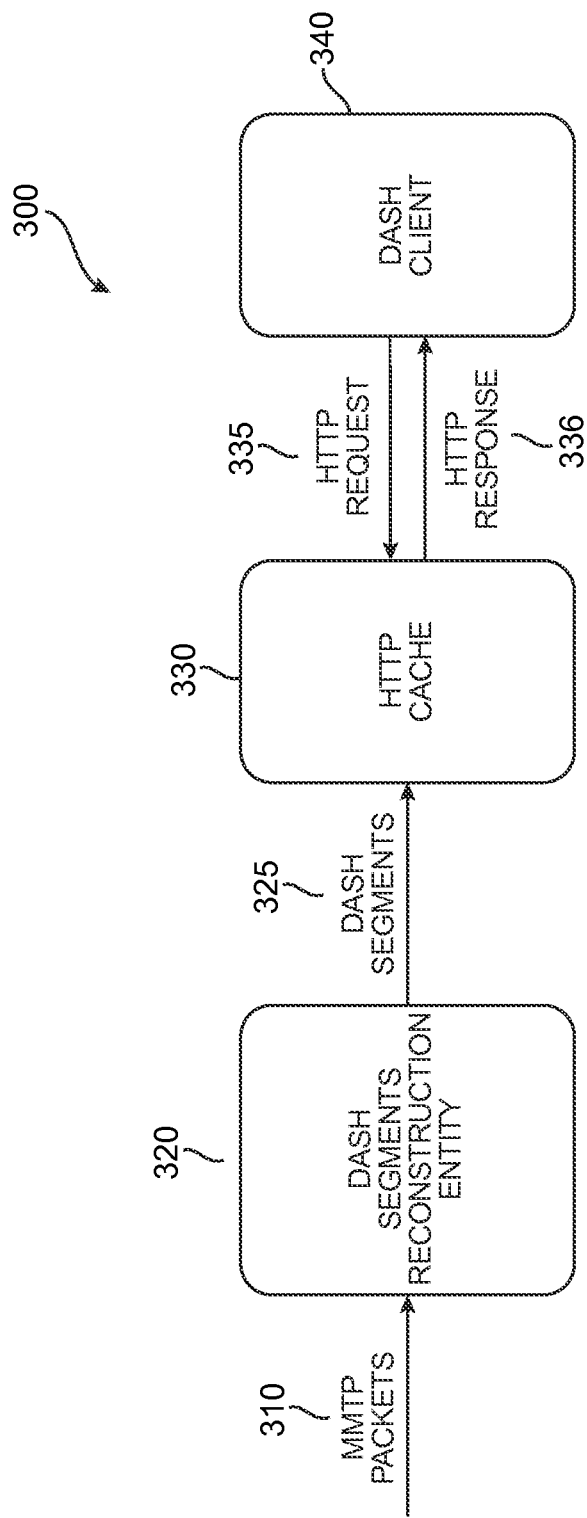
FIG. 3 illustrates a Dynamic Adaptive HTTP Streaming (DASH) system that receives DASH segments over multimedia multiplexing transport protocol (MMTP) showing a client with an HTTP cache.

FIG. 3 illustrates an example DASH architecture 300. As shown in FIG. 3, the architecture 300 includes receiving MMTP packets 310 (e.g., from a broadcast network), a DASH segment reconstruction entity 310 that forwards/sends DASH segments 325 to an HTTP cache 330, and a DASH streaming client 340. The DASH client 340 provides an HTTP request 335 to the HTTP cache 330 and receives an HTTP response 336. If the DASH streaming client 340 receiving DASH Segments 325 over MMTP has HTTP/1.1 cache (e.g., the HTTP cache 330), reconstructed DASH Segments 325 are consumed by DASH streaming client 340 through the HTTP cache 330. As soon as complete DASH segments 325 are reconstructed by the DASH segment reconstruction entity 310 they are moved to the HTTP cache 330, then the DASH streaming client 340 receives DASH segments 325 through the normal HTTP/1.1 Request 335/ Response 336 operations.

When streaming a DASH presentation, e.g. over a broadcast channel, the HTTP protocol can no longer be used. MMTP provides the necessary tools to support the delivery of a DASH presentation. A DASH presentation consists of the presentation information, which is the MPD and the data segments (initialization and media segments). The MPD makes the core part of the presentation information of the presentation. The MPD is assigned its own multi-purpose Internet mail extensions (MIME) type: "application/dash+ xml", which is used to identify the type of the presentation. The MPD is embedded in a message passing interface (MPI) table, which in turn is delivered using an MPI message. The format of the message may either be binary or XML. In case of XML format, the MPD is embedded using the <![CDATA[ ]]>(e.g., marked for the parser to interpret as only character data, not markup data) encapsulation. The MPD updates are delivered using the same mechanism. The updates are discovered by checking for the table identifier in signaling messages of that particular package. The MPD is then used by the client (DASH client) to drive the presentation. It is required that all segments that are addressed by the MPD shall be readily available at the receiver side, i.e., delivered and recovered by their segment availability start time. This may be ensured by setting delivery schedule and hypothetical receiver buffer model (HRBM) parameters appropriately.

Figure 4:
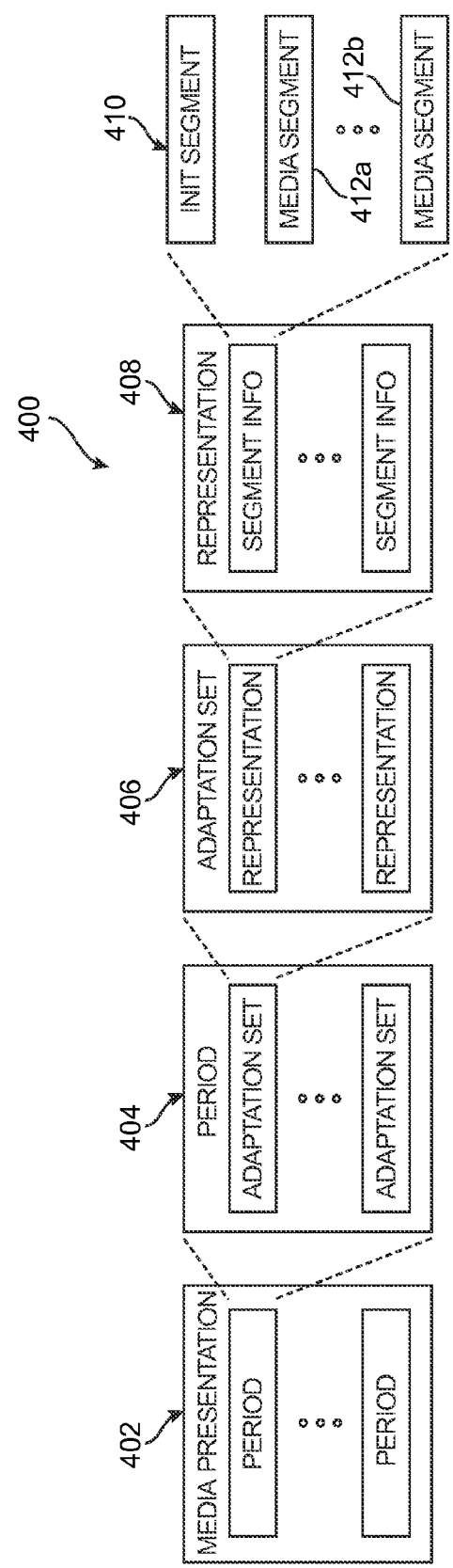
FIG. 4 illustrates an example structure of a media presentation description (MPD) file.

FIG. 4 illustrates an example structure of an MPD file 400 implemented by an embodiment. The MPD file 400 includes a media presentation 402, a period 404, an adaptation set 406, a representation 408, an initial segment 410, and media segments 412a-412b. In one or more embodiments, the MPD file 400 may be implemented in the networked system 200.

Referring to FIGS. 3 and 4, in the DASH protocol, a content preparation step may be performed in which content is segmented into multiple segments. An initialization segment may be created to carry information used to configure a media player. The information allows the media segments to be consumed by a client device (e.g., DASH client 340). The content may be encoded in multiple variants, such as several bitrates. Each variant corresponds to a representation 408 of the content. The representations 408 may be alternative to each other or may complement each other. In the former case, the client device selects only one alternative out of the group of alternative representations 408. Alternative representations 408 are grouped together as an adaptation set 406. The media presentation defines the video sequence with one or more consecutive periods 404 that break up the video from start to finish. Each period 404 contains multiple adaptation sets 406 that contain the content that comprises the audio/video experience. This content can be muxed, for example content including video and audio content at the International Standards Organization (ISO)-base media file format (ISOBMFF) media file (MPU) level (see, e.g., Information technology-High efficiency coding and media delivery in heterogeneous environments—Part 1: MPEG media transport (MMT),ISO/IEC JTC 1/SC 29, 2013, Apr. 26, 2013, Part 11: MPEG Composition Information, ISO/IEC JTC 1/SC 29 N14361, Apr. 4, 2014) but not internal to an ISOBMFF container. Each content compo47nent is realized as a sequence of ISOBMFF containers. In one example, there may be one adaptation set 406, or content represented in elementary streams of MPUs.

The adaptation set 406 may enable features like multiple language support for audio. Each adaptation set 406 contains multiple representations 408, each a single stream in the adaptive streaming experience. In one example, a first representation 408 may provide 640×480@500 Kbps, while a second representation 408 may provide 640×480@250 Kbps. Each representation 408 is divided into media segments, essentially the chunks of data that all HTTP-based adaptive streaming technologies use. Data chunks can be presented in discrete files, as in HTTP live streaming (HLS), or as byte ranges in a single media file. Presentation in a single file helps improve file administration and caching efficiency as compared to chunked technologies that can create hundreds of thousands of files for a single audio/video event.

The client device may continue to add complementary representations 408 that contain additional media components. The content offered for DASH streaming may be described to the client device. This may be done using the MPD file 400. The MPD file 400 is an extensible markup language (XML) file that contains a description of the content, the periods 404 of the content, the adaptation sets 406, the representations 408 of the content, and how to access each piece of the content. An MPD element is the main element in the MPD file 400, as it contains general information about the content, such as its type and the time window during which the content is available.

The one or more periods 404 each describes a time segment of the content. Each period 404 may contain one or more representations 408 of the content grouped into one or more adaptation sets 406. Each representation 408 is an encoding of one or more content components with a specific configuration. Representations 408 differ mainly in their bandwidth requirements, the media components they contain, the codecs in use, the languages, or the like. The MPD file 400 identifies the various content components and the location of all alternative streams. This enables a DASH player (e.g., a client device 100, FIG. 1, client devices 220, 230, 225, 235, FIG. 2) to identify and start playback of the initial segments, switch between representations 408 as necessary to adapt to changing CPU and buffer status, and change adaptation sets 406 to respond to user input.

When delivering DASH content using the musical instruments digital interface (MIDI) processing unit (MPU) mode, each representation 408 is considered as an MPU. It is important to note that the concatenation of all segments of a representation 408 results in a fragmented ISOBMFF compatible file, which is equivalent to an MPU in MMTP terms. The initialization segment of a representation 408 is the MPU metadata and is marked appropriately during the delivery to ensure that it is recovered by the client device/ receiver. The MPU metadata has to be delivered repetitively to ensure that all client devices, independent of the time they join the session will ultimately be able to recover it. The MPU mode provides the means for marking these important packets by setting a format table (FT) field to MPU metadata. Similarly, fragment metadata is important for every fragment and should also be delivered repetitively to increase the probability of recovery.

All segments of a representation 408 are then marked as belonging to the same MPU by using the same packet_id and MPU sequence number to mark them. The mapping between the representation 408 and the packet_id and MPU sequence number is provided by the Identifier_mapping syntax element that is provided in a media presentation (MP) table. One usage of the identifier_mapping is to provide the representation_id as provided in the MPD. Other approaches, e.g. using the URL template for all segments of that Representation may be used instead.

At the sender side, the data is delivered on movie fragment basis. At the receiver side (e.g., client device), each media segment needs to be recovered appropriately and timely. It is then necessary for the receiver to be able to identify the segment boundaries and the segment information. For example, a segment is recovered by identifying its boundaries using the presence of the segment index box ("sidx") from the current and the following segment; a segment is recovered by checking the timestamp of the first sample in the movie fragment (for example extracted from the "tfdt" box or the "sidx" box) and using the MPD to identify the media segment that has the same starting time; or the segment boundary may be determined from the segment duration by dividing the fragment start time by the duration of the media segment for that representation 408.

Figure 5:
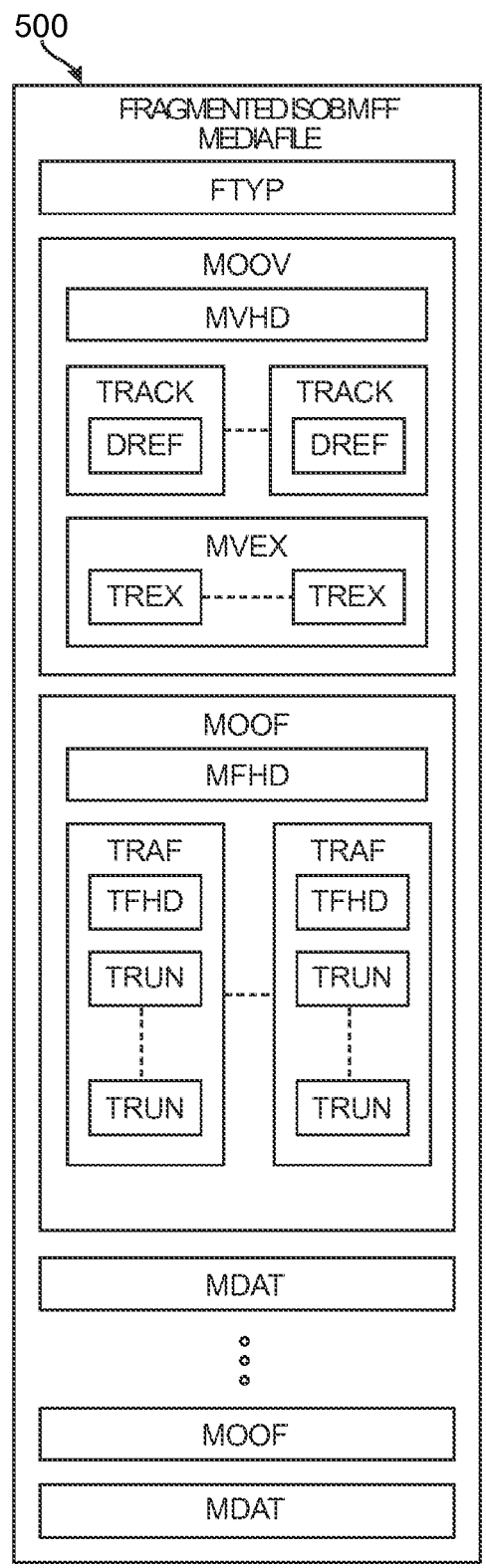
FIG. 5 illustrates an example structure of a fragmented International Standards Organization (ISO)-base media file format (ISOBMFF) media file.

FIG. 5 illustrates an example structure of a fragmented International Standards Organization (ISO)-base media file format (ISOBMFF) media file 500 implemented by one or more embodiments. In one or more embodiments, the ISBOMFF media file 500 may be implemented in the networked system 200 (FIG. 2). In one deployment scenario of DASH, the ISOBMFF format and its derivatives (such as the MP4 and 3GP file formats) are used. The content is stored in movie fragments. Each movie fragment contains media data and the corresponding metadata. The media data may include a collection of media samples from all media components of the representation 408 (FIG. 4). Each media component is described as a track of the file.

In DASH, the client device is fully responsible for the media session and controls the rate adaptation by deciding on which representation 408 (FIG. 4) to consume at any particular time. DASH is thus a client-driven media streaming solution.

When using a generic file delivery (GFD) mode in DASH, each segment of the DASH representation 408 (FIG. 4) is delivered as a regular file. The connection between those segments may be established using the packet_id. The connection between the file (transport object) and the segment information is established using the identifier_mapping information in the MP table. The most appropriate mapping in this case may be the URL template or the URL list. Based on that mapping the segment number and the segment URL may be determined.

Figure 6:
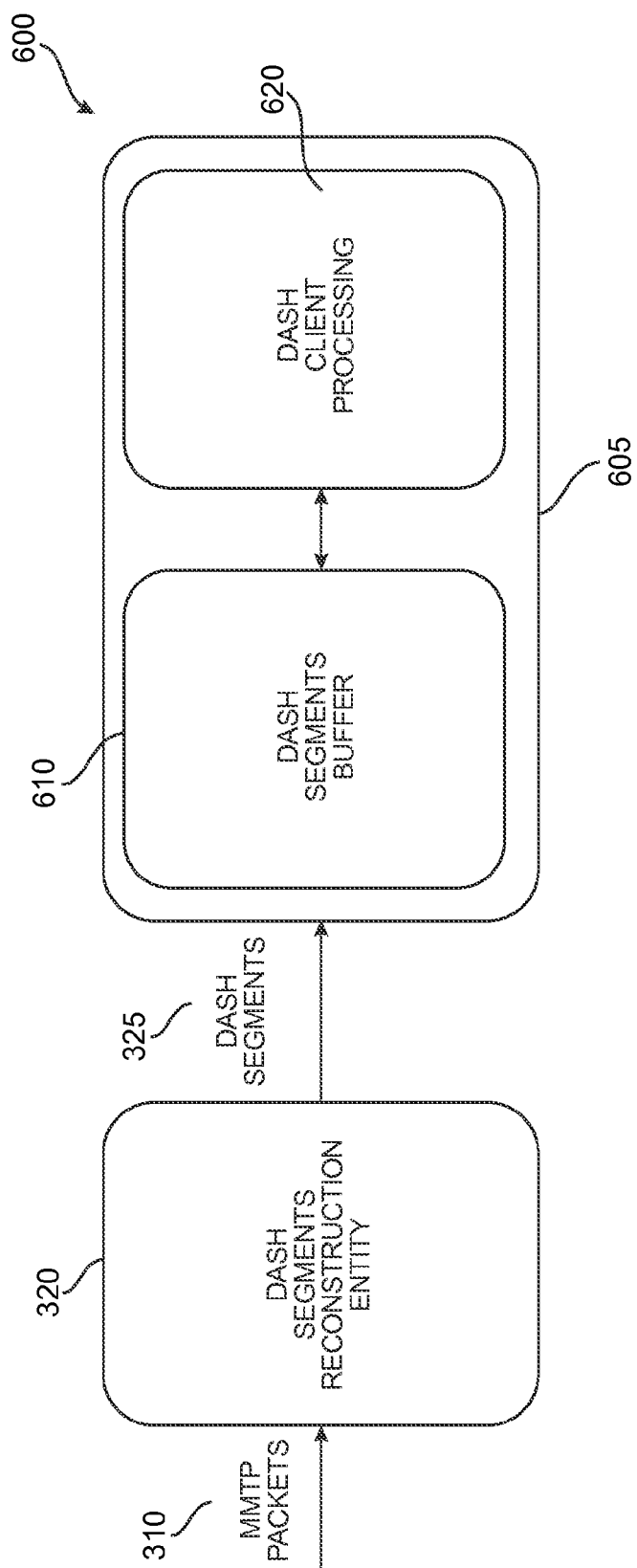
FIG. 6 illustrates a DASH system showing a client device without an HTTP cache employing a (broadcast) DASH segments buffer, according to one embodiment.

FIG. 6 illustrates a DASH system 600 showing a DASH client device 605 without an HTTP cache employing a (broadcast) DASH segments buffer 610, according to one embodiment. For the DASH use application using MMTP for the delivery of DASH service, the MPD can be received as an MPI_table( ) with MIME type set to application/dash+xml. MMTP provides GFD mode for the delivery of any type of generic file. Any DASH segment may be delivered as a generic file using the GFD mode of MMTP (e.g., over a one-way broadcast network). In one embodiment, the MMTP packets 310 are reconstructed as DASH segments 325 by the DASH segments reconstruction entity 320 (FIG. 3). MPU mode of MMTP is used to deliver MPUs. Therefore, MPU mode can be used to deliver a DASH segment 325 when it also has 'mpuf' as a compatible brand. In one embodiment, the DASH client device 605 that receives DASH segments 325 over MMTP does not have an HTTP/1.1 cache. In one embodiment, reconstructed DASH segments 325 are consumed by the DASH client 605 device through the DASH segments buffer 610. As soon as complete DASH segments 325 are reconstructed they are moved to the DASH segments buffer 610, which stores DASH segments 325 with associated URLs. DASH client processing 620 proceeds to make requests and receive responses from the DASH segments buffer 610. In one embodiment, the DASH client processing includes the components/elements of the architecture 800 (FIG. 8) described below.

Figure 7:
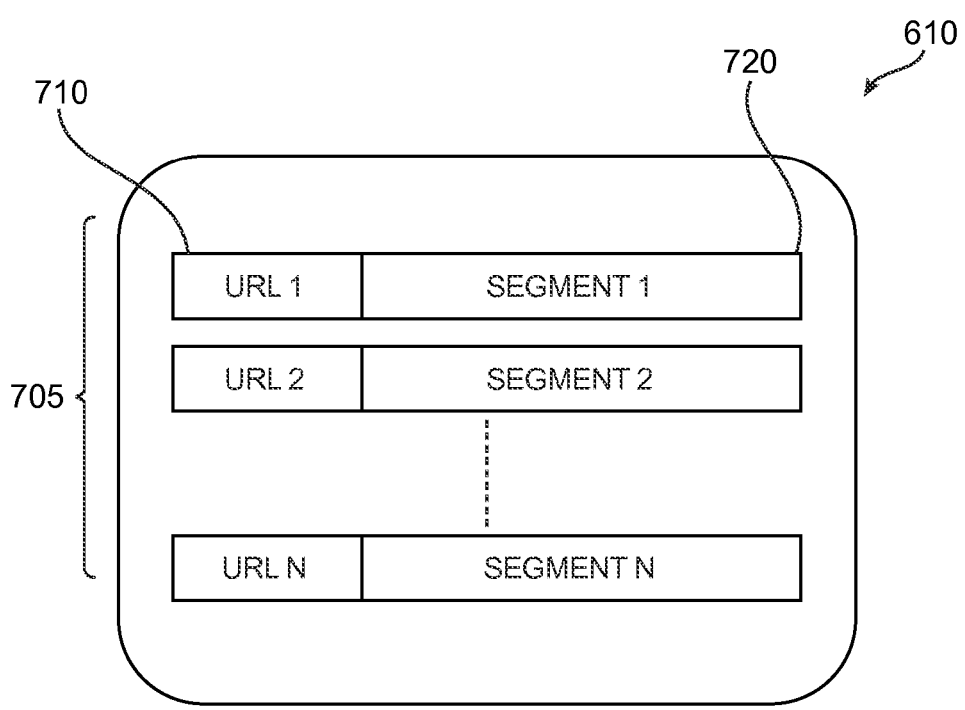
FIG. 7 illustrates an example (broadcast) DASH segments buffer with one or more DASH segments each including uniform resource locator (URL) information, according to one embodiment.

FIG. 7 illustrates an example (broadcast) DASH segments buffer 610 with one or more DASH segments 705 each including uniform resource locator (URL) 710 information along with an associated segment 720, according to one embodiment. Associated URLs 710 of DASH segments 705 may be found from a GFD table when GFD mode is used or from an mmpu box when MPU mode is used. The DASH client device 605 in this case looks in the DASH segments buffer 610 to find an appropriate segment 720 by using a URL 710 as an index for the search. There may be more than one representation 408 (FIG. 4) delivered into the DASH segments buffer 610, each comprising different data rates, levels of video quality and robustness. In one embodiment, if a segment 720 at the desired quality level is not found, a segment 720 at the next lower quality level may be found, if available.

In one embodiment, different bit rates are provided for dealing with network congestion, e.g. the bit rate is reduced as the segments buffer 610 becomes filled. In one example, network congestion may not be a problem encountered, but signal strength and impairments may provide a problem. In this case, a more robust signal may be chosen with more forward error correction (FEC) bits and less data bits. In one example using an embodiment, two services are simulcast: one service for a fixed TV and another service for a mobile TV. The fixed TV service is of a higher data rate than the mobile TV service, which has a higher level of robustness implemented by sending additional FEC bits.

Figure 8:
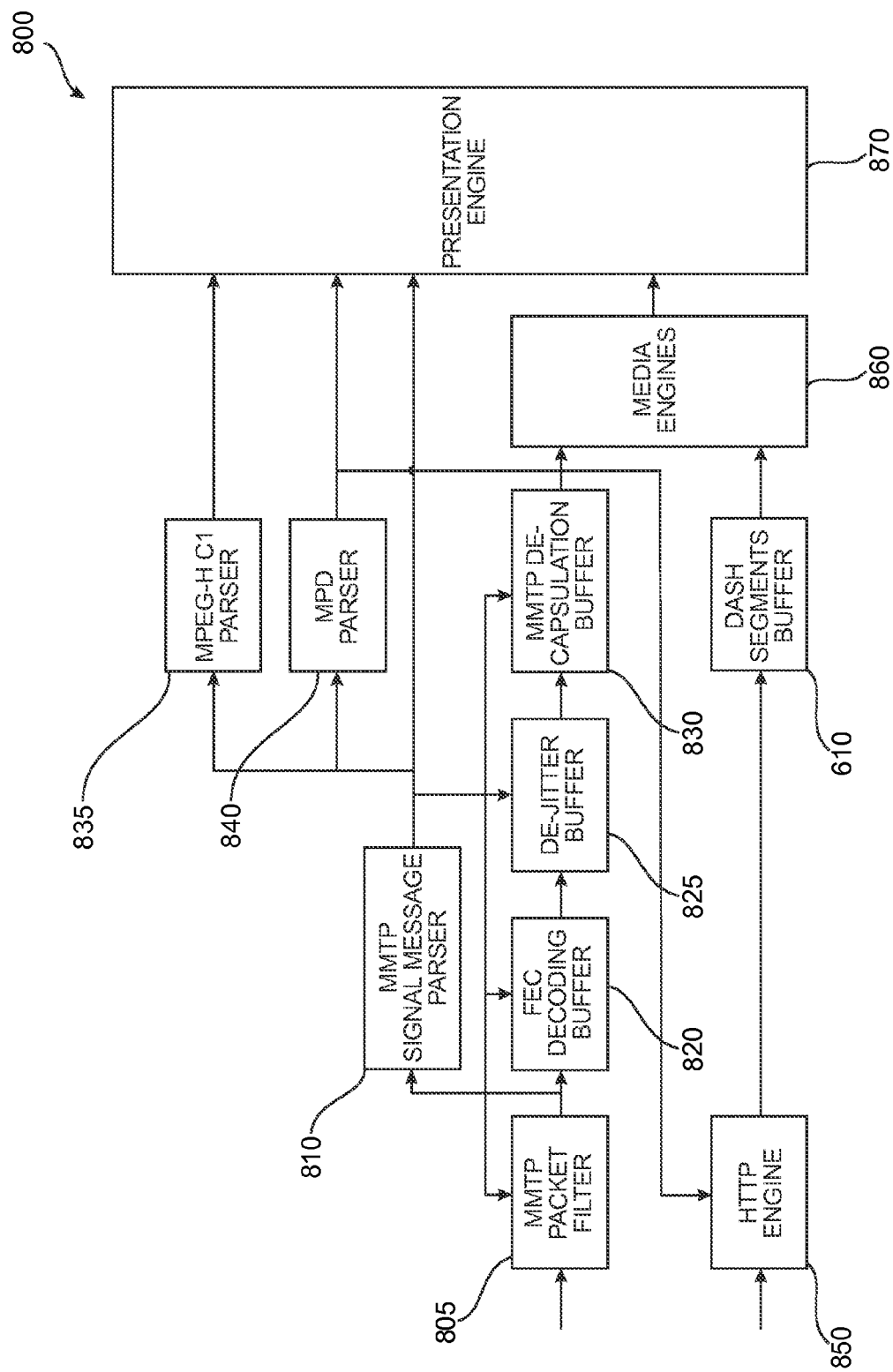
FIG. 8 illustrates an example architecture of the client device shown in FIG. 6, according to one embodiment.

FIG. 8 illustrates an example architecture 800 for the DASH client processing 620 for the client device 605 shown in FIG. 6, according to one embodiment. In one embodiment, the architecture 800 shows a portion of the elements used for DASH client processing 620 using the DASH segments buffer 610. In one embodiment, the architecture 800 includes an MMTP packet filter 805, MMTP signal message parser 810, FEC decoding buffer 820, De-jitter buffer 825, MMTP De-capsulation buffer 830, HTTP engine 850, MPEG-H CI parser 835, (DASH) MPD parser 840, DASH segments buffer 610, media engines 860 and the presentation engine 870.

In one embodiment, the MMTP packet filter 805 receives MMTP packets from the broadcast network (e.g., one-way broadcast network) and delivers them to the appropriate processing block, either the MMTP signal message parser 810 or the FEC decoding buffer 820. In one embodiment, the MMTP packet filter 805 performs the following checks depending on the packet_id of each MMTP packets. When the DASH client device 605 is tuned into the specific service, then the MMTP packet filter 805 is only given the packet_id of MMTP signaling messages by the processing block (not shown). After the MPT_message is processed by the MMTP signal message parser 810, the MMTP packet filter 805 is given the packet_id of media component and starts to filter MMTP packets with a media component.

In one embodiment, the MMTP signal message parser 810 receives MMTP packets from the MMTP packet filter 805 and parses the MMTP signaling message carried in the packet. Information retrieved from the MMTP signaling message is delivered to the appropriate processing blocks. In one embodiment, when the DASH client device 605 is tuned into the specific service, the MMTP signal message parser 810 firstly looks for the MPT_message and processes it to obtain the list of MMT assets and their packet_ids. Whenever an MPI_message is received, the MMTP message parser 810 processes the PI_content_type_byte field of MPI_table( ) and then delivers the data carried as PI_content_byte of MPI_table( ) to either the MPEG-H CI parser 835, the MPD parser 840 or the presentation engine 870. In one embodiment, if the value of PI_content_type_byte is HTML5, then the contained data is delivered to the presentation engine 870. If the value of the PI_content_type_byte is MPEG-H CI then the contained data is delivered to the MPEG-H CI parser 835. If the value of the PI_content_type_byte is DASH MPD, then the contained data is delivered to the (DASH) MPD parser 840.

In one embodiment, whenever an AL_FEC message is received, the information in the message is signaled to the FEC decoding buffer 820. Whenever an HRBM message is received, the information in the message is signaled to the De-jitter buffer 825. In one embodiment, the MPEG-H CI parser 835 receives MPEG-H CI from the MMTP signal message parser 810 and processes it. The presentation time of the first access unit of the MPU is known from the 'MediaSync' element referencing such MPU and is delivered to the presentation engine 870. The presentation time of the first access unit of the first segment described by the DASH MPD is also known from the 'MediaSync' elements referencing the relevant DASH MPD file and is delivered to the presentation engine 870.

In one embodiment, the (DASH) MPD parser 840 receives the DASH MPD through the MMTP signal message parser 810 and processes it. The (DASH) MPD parser 840 provides relative presentation time of each DASH segment to the presentation engine 870. In one embodiment, the FEC decoding buffer 820 receives MMTP packets with dedicated packet_id and immediately copies packets to the De-jitter buffer 825. If there are any packets which are not received until the protection window time of an AL_FEC message signaled by the MMTP signal message parser 810, a repair operation is applied to the received packets. If packets are recovered they are also immediately copied to the De-jitter buffer 825.

In one embodiment, the De-jitter buffer 825 receives MMTP packets from the FEC decoding buffer 820. The De-jitter buffer 825 stores those packets until the fixed_end_to_end_delay provided by the HRBM message has passed since the time specified in the time_stamp field of each MMTP packet and copies them to the MMTP De-capsulation buffer 830. In one embodiment, the MMTP De-capsulation buffer 830 depacketizes MMTP packets received from the De-jitter buffer 825 and reconstructs the MPUs. Reconstructed MPUs are delivered to the media engines 860.

In one embodiment, the HTTP engine 850 makes GET requests with the URL received from the MPD parser 840 through the broadband network and receives DASH segments as responses. Received DASH segments are delivered to the DASH segments buffer 610.

In one embodiment, the DASH segments buffer 610 receives DASH segments from the HTTP engine 850 and delivers them to media engines 860 as soon as the processing of previously delivered DASH segments are finished. In one embodiment, the media engines 860 receive MPUs and DASH segments and decodes them with appropriate decoders. The media engines 860 delivers decoded results to the presentation engine 870. In one embodiment, the presentation engine 870 receives the HTML 5 document from the MMTP signal message parser 810. The presentation engine 870 renders media data from the media engines 860 in the location specified by the HTML 5 document and at the time provided by the MPEG-H CI parser 835 and the MPD parser 840.

Figure 9A:
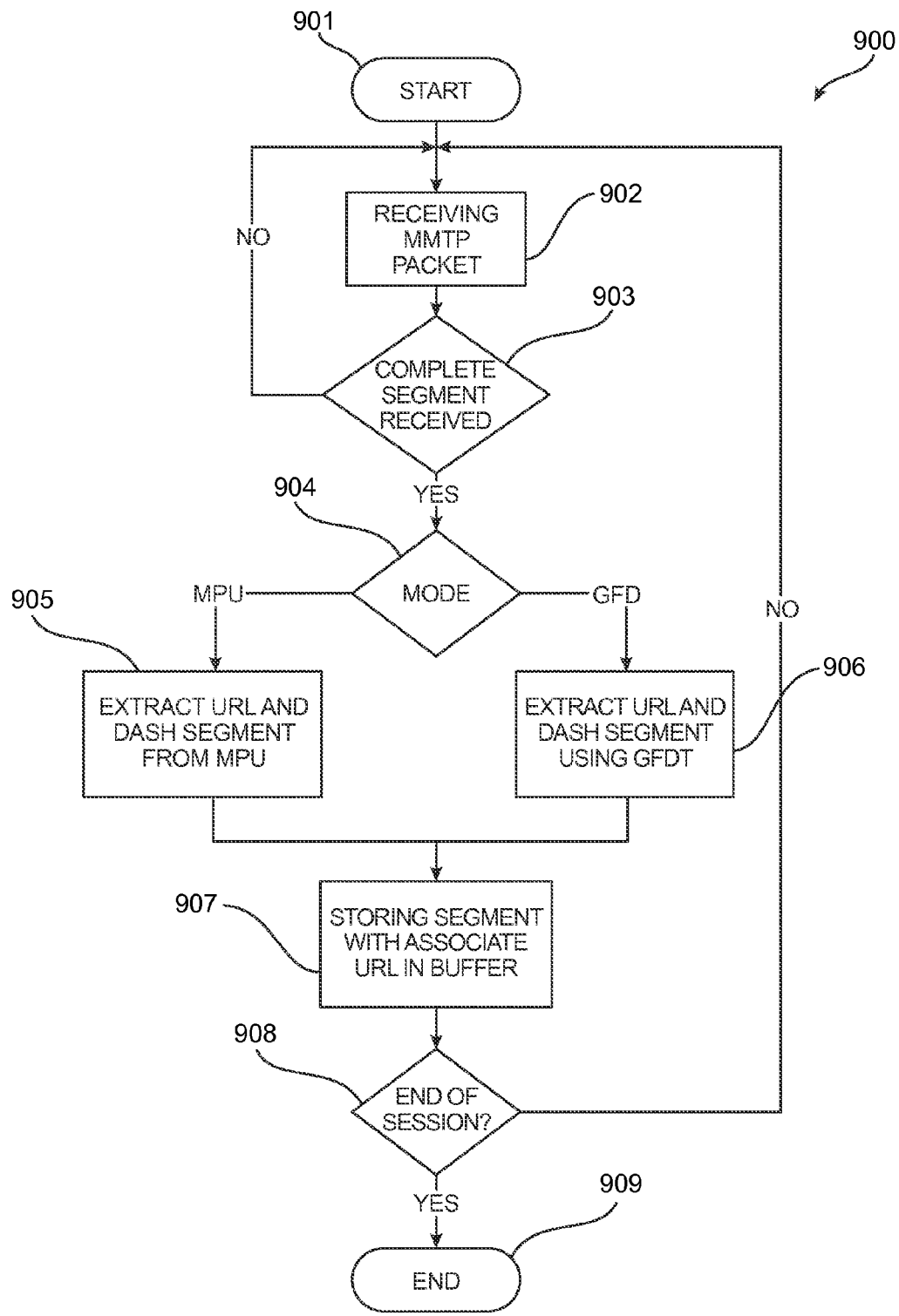
FIG. 9A illustrates a flow diagram showing extraction of URL information and storing the extracted information with a segment in a (broadcast) segments buffer, according to one embodiment.

FIG. 9A illustrates a flow diagram 900 showing extraction of URL information and storing the extracted information with a segment in a (broadcast) segments buffer, according to one embodiment. In one embodiment, flow diagram 900 begins at the start 901 of the process. In block 902 an MMTP packet is received. In one embodiment, in block 903, it is determined if a complete segment is received. If the complete segment has not yet been received, the process continues at block 902 and proceeds until the complete segment is received. In one embodiment, in block 904, the mode is determined to be either MPU mode or GFD mode. If the mode is determined to be MPU mode, the flow proceeds to block 905. If the mode is determined to be GFD mode, the flow proceeds to block 906.

In one embodiment, in block 905 the URL and DASH segment are extracted from the MPU. In block 906, the URL and DASH segment are extracted using GFD transmission (GFDT). In one embodiment, in block 907, the extracted segment and associated URL are stored together in the (DASH) segments buffer. In block 908, it is determined if the end of the session is reached. If the end of the session is reached, process 900 proceeds to block 909 where the process 900 ends. If it is determined that the end of the session has not been reached, process 900 proceeds to block 902.

Figure 9B:
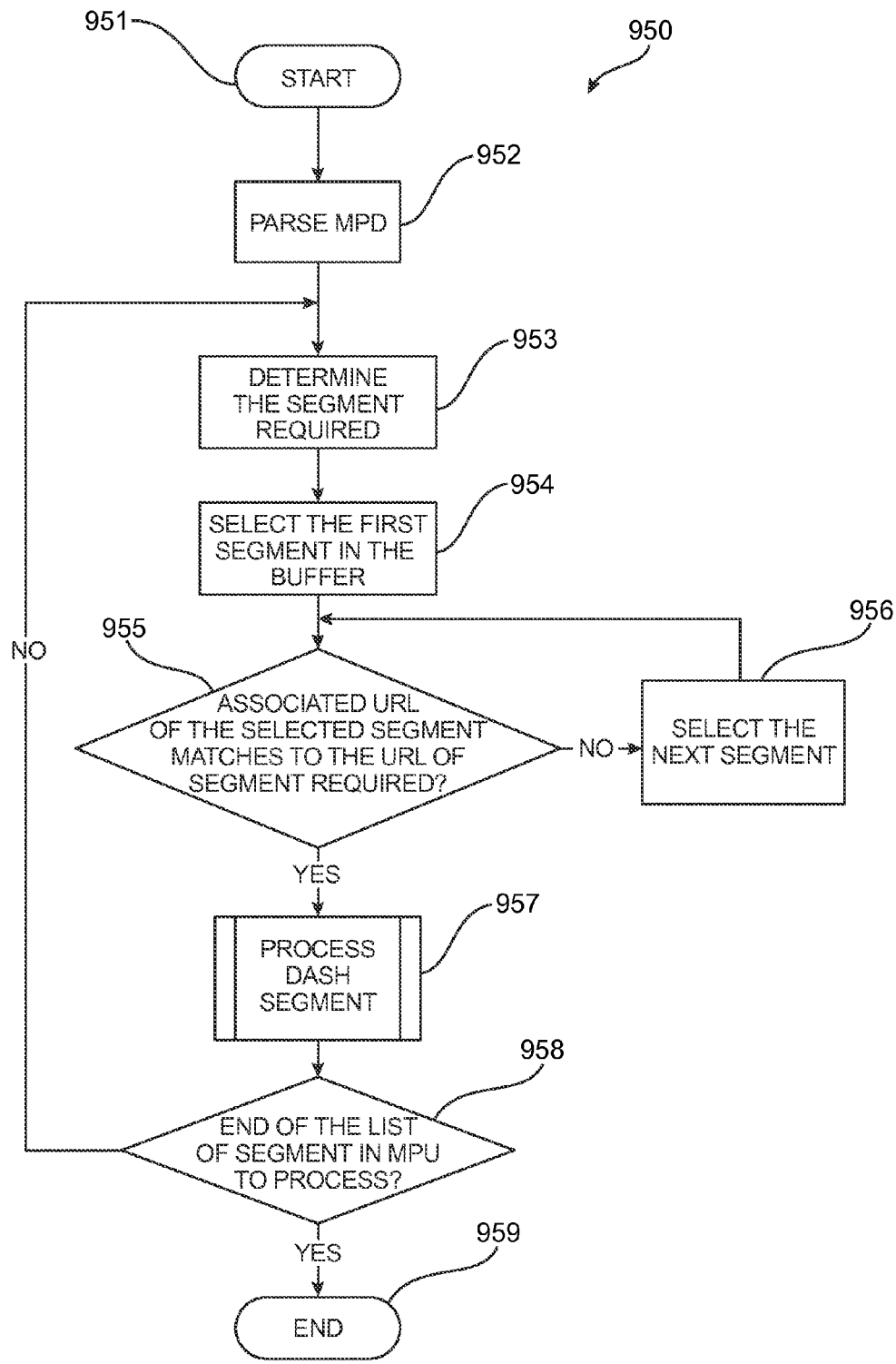
FIG. 9B illustrates a flow diagram showing DASH segment processing based on URL information, according to one embodiment.

FIG. 9B illustrates a flow diagram 950 showing DASH segment processing based on URL information, according to one embodiment. In one embodiment, flow diagram 950 begins at the start 951 of the process based on receiving an MPD and one or more segments. In block 952 the MPD is parsed for obtaining information regarding the segments. In one embodiment, in block 953, based on a request from a client device, the segment required is determined. In block 954 the first segment in the DASH segments buffer is selected. In one embodiment, in block 955 it is determined if the associated URL of the selected segment matches the URL of the segment required. If a match occurs in block 955, the process 950 proceeds to block 957. If the match in block 955 does not occur, the process 950 proceeds to block 956. In block 956, the next segment is selected and the process 950 proceeds to block 955.

In one embodiment, in block 957 the DASH segment is processed for presentation on the client device. In block 958, it is determined if the process 900 is at an end of the list of segments in MPU to process. If the process 900 is at the end of the list, process 950 proceeds to block 959 and the process 900 ends. If process 900 is not at the end of the list yet, the process 950 proceeds to block 953 to continue the process 950.

Figure 10:
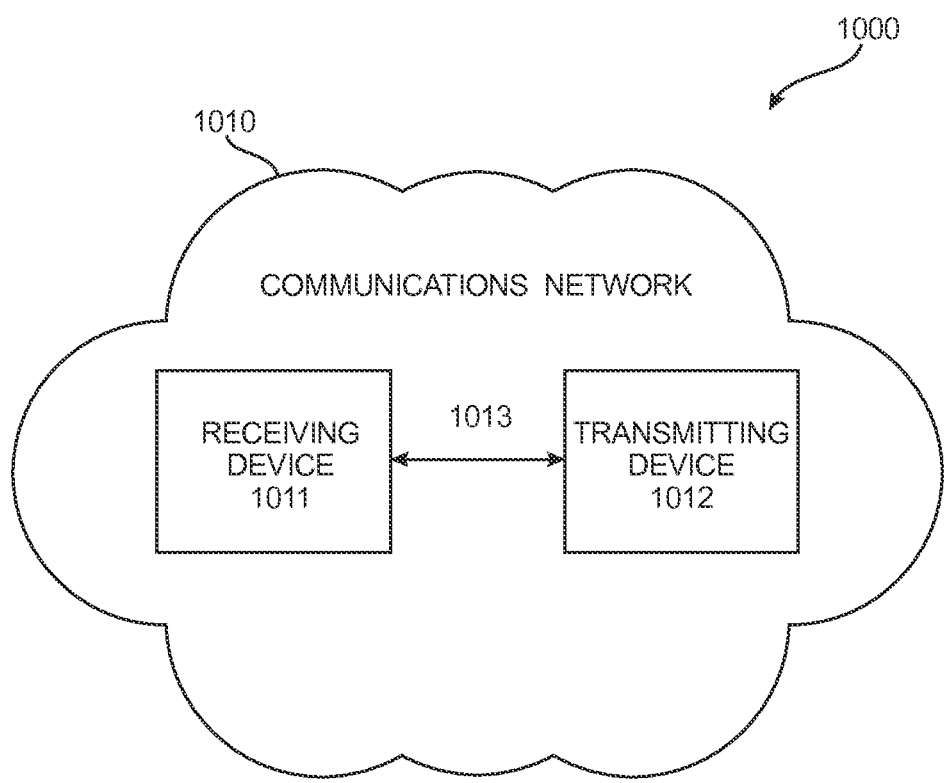
FIG. 10 illustrates a schematic view of a communications system, according to one embodiment.

FIG. 10 is a schematic view of a communications system in accordance with one embodiment. Communications system 1000 may include a communications device that initiates an outgoing communications operation (transmitting/initiator device 1012) and communications network 1010, which transmitting device 1012 may use to initiate and conduct communications operations with other communications devices within communications network 1010. For example, communications system 1000 may include a communication device that receives the communications operation from the transmitting device 1012 (receiving device/listener 1011). Although communications system 1000 may include several transmitting devices 1012 and receiving devices 1011, only one of each is shown in FIG. 10 to simplify the drawing.

Any suitable circuitry, device, system or combination of these (e.g., a wireless communications infrastructure including communications towers and telecommunications servers) operative to create a communications network may be used to create communications network 1010. Communications network 1010 may be capable of providing communications using any suitable communications protocol. In some embodiments, communications network 1010 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 1010 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. Transmitting device 1012 and receiving device 1011, when located within communications network 1010, may communicate over a bidirectional communication path such as path 1013. Both transmitting device 1012 and receiving device 1011 may be capable of initiating a communications operation and receiving an initiated communications operation.

Transmitting device 1012 and receiving device 1011 may include any suitable device for sending and receiving communications operations. For example, transmitting device 1012 and receiving device 1011 may include smart television device, a media player, a cellular telephone or a landline telephone, a personal e-mail or messaging device with audio and/or video capabilities, pocket-sized personal computers such as an iPAQ, personal digital assistants (PDAs), a desktop computer, a laptop computer, and any other device capable of communicating wirelessly (with or without the aid of a wireless enabling accessory system) or via wired pathways (e.g., using traditional telephone wires), such as client device 100, FIG. 1, client devices 220, 230, 225, 235, FIG. 2, DASH client device 605, FIG. 6. The communications operations may include any suitable form of communications, including for example, voice communications (e.g., telephone calls), data communications (e.g., e-mails, text messages, media messages), or combinations of these (e.g., video conferences).

Figure 11:
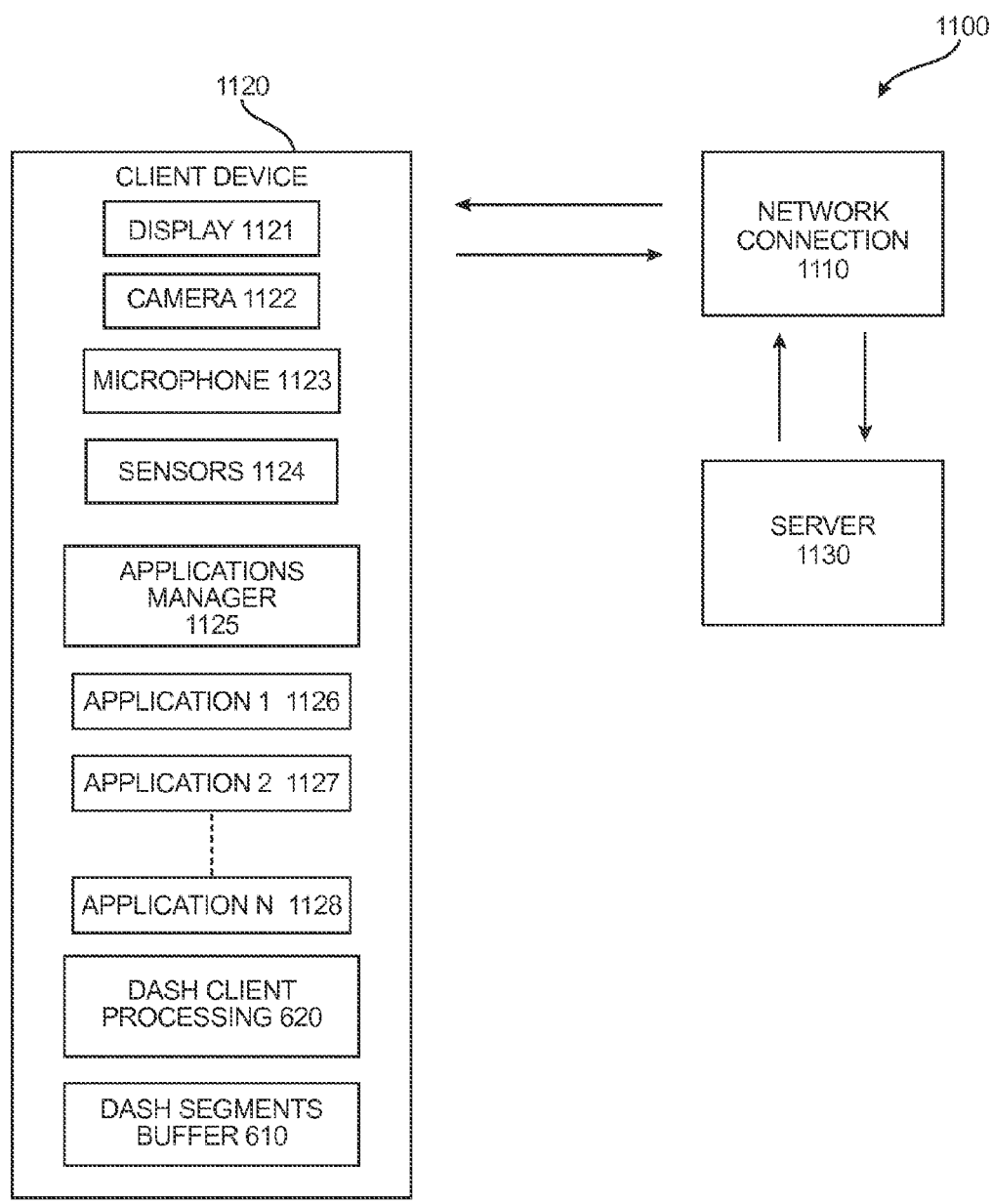
FIG. 11 illustrates a DASH client device without an HTTP cache employing a (broadcast) DASH segments buffer, according to one embodiment.

FIG. 11 illustrates a DASH client device 1120 without an HTTP cache employing a (broadcast) DASH segments buffer 610, according to one embodiment. In one embodiment, the system 1100 comprises a client device 1120 (e.g., a smart TV, a digital TV, a mobile computer, tablet, etc.), an optional cloud or server device 1130 and network connection device 1110. In one embodiment, the client device 1120 comprises a display 1121, a camera or imaging device 1122 (either integrated with the TV 1120 or separate from the TV 1120), a microphone(s) 1123, sensors 1124 (e.g., light, temperature, vibration, location/GPS, facial recognition, wireless device sensor, etc.), an application manager module 1125 for managing applications, such as application 1 1126, application 2 1127 up to application N 1128, N being a positive integer, DASH client processing 620 and the DASH segments buffer 610. In one embodiment, the DASH client processing 620 performs DASH segment and MPD processing as described above.

In one embodiment, the display 1121 may be a separate device from the television device 1120 or integrated with the television device 1120. In one embodiment, the camera 1122 may be a separate device from the television device 1120 or integrated with the television device 1120. In one embodiment, the network connection device 1110 may comprise a network interface, such as a network modem, router, etc. for handling communications between the client device 1120 and the server device 1130 and for forming a local network that the client device 1120 may be connected with (e.g., network 205, FIG. 2).

In one embodiment, the client device 1120 may comprise input mechanisms (e.g., touchscreen, voice recognition, keyboards, remote control, etc.), communications circuitry, control circuitry, audio output, and any other suitable components.

In one embodiment, all of the applications employed by display 1121, the input mechanism, the audio output and communications circuitry may be interconnected and managed by control circuitry. In one example, a hand held music player capable of transmitting content including video, music, etc. to other devices may be incorporated into the client device 1120.

In one embodiment, the audio output may include any suitable audio component for providing audio to a user of the client device 1120. For example, the audio output may include one or more speakers (e.g., mono or stereo speakers) built into the client device 1120. In some embodiments, the audio output may include an audio component that is remotely coupled to the client device 1120. For example, the audio output may include a headset, headphones or earbuds that may be coupled to communications device with a wire (e.g., coupled to the client device 1120 with a jack) or wirelessly (e.g., Bluetooth® headphones or a Bluetooth® headset).

In one embodiment, display 1121 may include any suitable screen or projection system for providing a display visible to the user. For example, display 1121 may include a screen (e.g., an LCD screen) that is incorporated in the client device 1120. As another example, display 1121 may include a movable display or a projecting system for providing a display of content on a surface remote from the client device 1120 (e.g., a video projector). Display 1121 may be operative to display content (e.g., information regarding communications operations or information regarding available media selections) under the direction of the control circuitry.

In some embodiments, the communications circuitry of the client device 1120 may be operative to create a communications network using any suitable communications protocol. For example, the communications circuitry may create a short-range communications network using a short-range communications protocol to connect to other communications devices. For example, the communications circuitry may be operative to create a local communications network using the Bluetooth® protocol with other electronic devices.

In one embodiment, the control circuitry of the client device 1120 may be operative to perform the operations of one or more applications 1 1126 to N 1128 implemented on the client device 1120. Any suitable number or type of applications may be implemented. Although the following discussion will enumerate different applications, it will be understood that some or all of the applications may be combined into one or more applications. Example applications may include include an application connection application, a dialog application, a map application, a media application (e.g., QuickTime, MobileMusic.app, or MobileVideo.app), social networking applications, etc. In some embodiments, the client device 1120 may include one or several applications operative to perform communications operations. For example, the client device 1120 may include a messaging application, a mail application, a telephone application, a voicemail application, an instant messaging application (e.g., for chatting), a videoconferencing application, a fax application, or any other suitable application for performing any suitable communications operation.

In one embodiment, a user may direct the client device 1120 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

Figure 12:
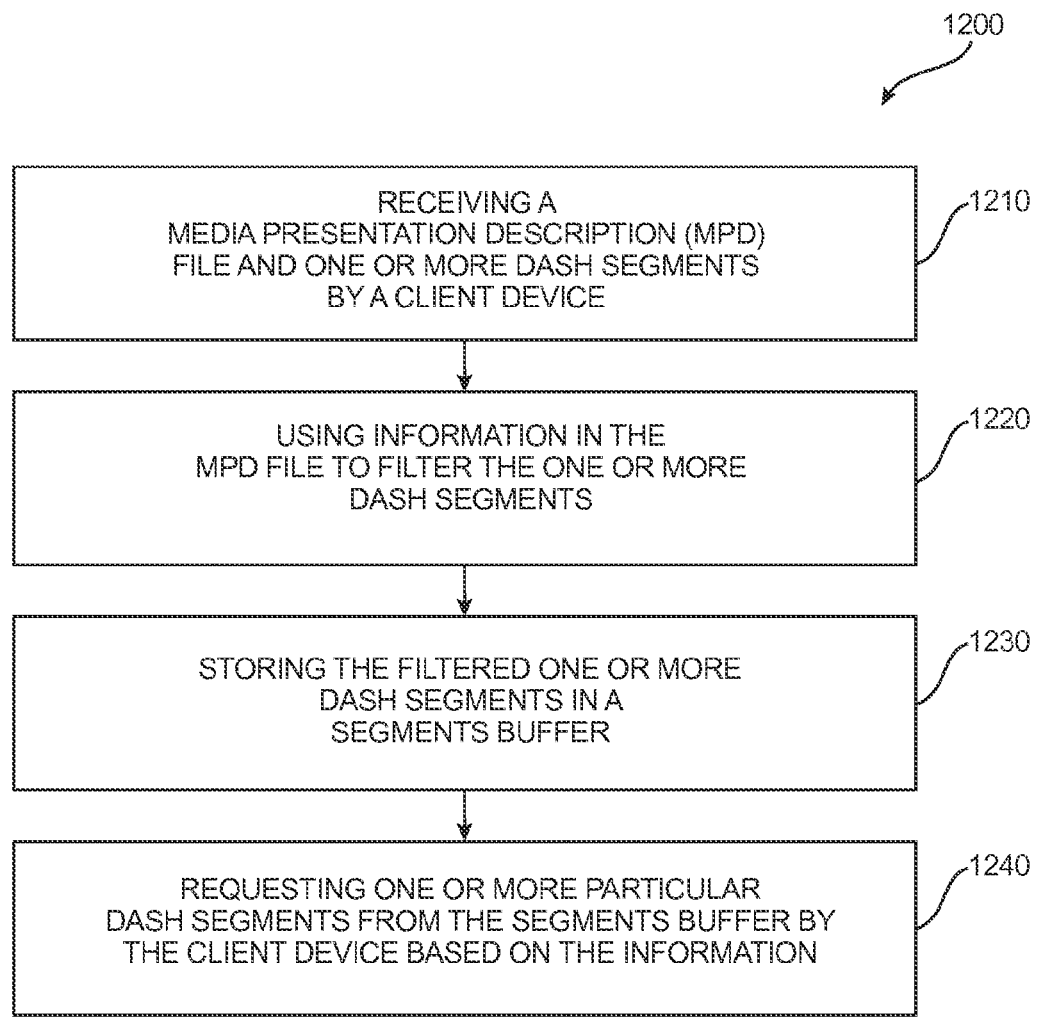
FIG. 12 shows a flow diagram for a client process including a broadcast DASH buffer receiving DASH segments through MMTP, according to one embodiment.

FIG. 12 shows a process 1200 for content delivery using DASH without using HTTP, according to one embodiment. In one embodiment, block 1210 in process 1200 includes receiving an MPD file (e.g., MPD file 400, FIG. 4) and one or more DASH segments by a client device (e.g., client device 100, FIG. 1, client device 220, 225, 230, 235, FIG. 2, client device 605). In one embodiment, in block 1220, information in the MPD file is used to filter the one or more DASH segments. In one embodiment, in block 1230, the filtered one or more DASH segments are stored in a segments buffer. In block 1240, one or more particular DASH segments are requested from the segments buffer by the client device based on the information.

In one embodiment, the information from the MPD file is URL information. In one embodiment, the one or more DASH segments and the associated URL information are stored together in the segments buffer. In one embodiment, process 1200 may include tuning to a service by the client device for receiving the one or more DASH segments over MMTP without using HTTP.

In one embodiment, the client device comprises the segments buffer without an HTTP cache. In one embodiment, process 1200 may provide that the one or more DASH segments comprise reconstructed DASH segments, and the reconstructed DASH segments are stored in the segments buffer immediately after reconstruction.

In one embodiment, the one or more reconstructed DASH segments comprise multiple representations. In one implementation, the multiple representations each comprise one or more of different data rates (e.g., 250 Kbps, 500 Kbps, 1000 Kbps, etc.) and different levels of video quality (e.g., ultra-high definition (UHD), high definition (HD), standard definition (SD), 640×480, 1024×768, etc.). In one embodiment, process 1200 may include if a requested DASH segment for a particular representation having a desired level of video quality is not found in the segments buffer, modifying the URL and searching for another representation of the requested DASH segment having a next lower level of video quality.

In one embodiment, process 1200 may include that the URL information is used as an index for searching the segments buffer for the one or more particular DASH segments.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    at a client device:
        receiving a broadcast over multimedia multiplexing transport protocol (MMTP), wherein the broadcast comprises a media presentation description (MPD) file and one or more dynamic adaptive hypertext transport protocol (HTTP) streaming (DASH) segments reconstructed from one or more generic files included in one or more MMTP packets of the broadcast;
        filtering the one or more DASH segments using information extracted from the MPD file;
        storing the filtered one or more DASH segments with the information extracted in a segments buffer; and
        requesting at least one DASH segment from the segments buffer based on the information extracted for presentation on the client device;
    wherein each DASH segment of the one or more DASH segments is delivered to the client device as a generic file using a generic file delivery mode of the MMTP, the generic file including a packet identifier, and the same packet identifier marking all DASH segments belonging to the one or more DASH segments.

2. The method of claim 1, wherein the information extracted comprises associated uniform resource locator (URL) information.

3. The method of claim 2, wherein the one or more DASH segments and the associated URL information are stored together in the segments buffer.

4. The method of claim 3, further comprising:
    at the client device:
        tuning to a broadcast service for receiving the one or more DASH segments over MMTP without using an HTTP server.

5. The method of claim 4, wherein the client device comprises the segments buffer without an HTTP cache.

6. The method of claim 2, wherein:
    the one or more DASH segments are reconstructed from the one or more generic files based on a table included in the MPD file, the table including a mapping between the packet identifier and corresponding segment information for the one or more DASH segments, and the corresponding segment information including the associated URL information; and
    the one or more DASH segments are stored in the segments buffer immediately after reconstruction with the associated URL information.

7. The method of claim 6, wherein the one or more DASH segments comprise multiple representations.

8. The method of claim 7, wherein the multiple representations comprise one or more of different data rates or different levels of video quality.

9. The method of claim 7, further comprising:
    at the client device:
        determining that a requested DASH segment for a particular representation having a desired level of video quality is not found in the segments buffer; and
        modifying the associated URL information and searching for another representation of the requested DASH segment having a next lower level of video quality.

10. The method of claim 2, wherein the associated URL information is used as an index for searching the segments buffer for a requested DASH segment.

11. The method of claim 1, wherein the client device is a smart television device or a mobile computing device.

12. A client device comprising:
    a segments buffer; and
    a dynamic adaptive hypertext transport protocol (HTTP) streaming (DASH) processor that is configured for:
        receiving a broadcast over multimedia multiplexing transport protocol (MMTP), wherein the broadcast comprises a media presentation description (MPD) file and one or more DASH segments reconstructed from one or more generic files included in one or more MMTP packets of the broadcast;
        filtering the one or more DASH segments using information extracted from the MPD file;
        storing the filtered one or more DASH segments with the information extracted in the segments buffer; and
        requesting at least one DASH segment from the segments buffer based on the information extracted for presentation on the client device;
    wherein each DASH segment of the one or more DASH segments is delivered to the client device as a generic file using a generic file delivery mode of the MMTP, the generic file including a packet identifier, and the same packet identifier marking all DASH segments belonging to the one or more DASH segments.

13. The client device of claim 12, wherein the information extracted comprises associated uniform resource locator (URL) information, and the one or more DASH segments and the associated URL information are stored together in the segments buffer.

14. The client device of claim 13, wherein the client device is configured for:
    tuning to a broadcast service for receiving the one or more HTTP segments without using HTTP communication.

15. The client device of claim 14, wherein the client device comprises the segments buffer without an HTTP cache.

16. The client device of claim 13, wherein the associated URL information is used as an index to search the segments buffer for a requested DASH segment.

17. The client device of claim 12, wherein the one or more DASH segments are stored in the segments buffer immediately after reconstruction.

18. The client device of claim 17, wherein the one or more DASH segments comprise multiple representations, and the multiple representations comprise different data rates or different levels of video quality.

19. The client device of claim 18, wherein the DASH processor is configured for:
    determining that a requested DASH segment for a particular representation having a desired level of video quality is not found in the segments buffer; and
    modifying the associated URL information, and searching for another representation of the requested DASH segment having a next lower level of video quality.

20. The client device of claim 12, wherein the client device is a smart television device or a mobile computing device.

21. A non-transitory processor-readable medium that includes a program that when executed by a processor performs a method comprising:

at a client device:
receiving a broadcast over multimedia multiplexing transport protocol (MMTP), wherein the broadcast comprises a media presentation description (MPD) file and one or more dynamic adaptive hypertext transport protocol (HTTP) streaming (DASH) segments reconstructed from one or more generic files included in one or more MMTP packets of the broadcast;
filtering the one or more DASH segments using information extracted from the MPD file;
storing the filtered one or more DASH segments with the information extracted in a segments buffer; and
requesting at least one DASH segment from the segments buffer based on the information extracted for presentation on the client device;
wherein each DASH segment of the one or more DASH segments is delivered to the client device as a generic file using a generic file delivery mode of the MMTP, the generic file including a packet identifier, and the same packet identifier marking all DASH segments belonging to the one or more DASH segments.

22. The non-transitory processor-readable medium of claim 21, wherein the information extracted comprises associated uniform resource locator (URL) information, and the one or more DASH segments and the associated URL information are stored together in the segments buffer.

23. The non-transitory processor-readable medium of claim 22, wherein the method further comprises:
at the client device:
tuning to a broadcast service for receiving the one or more HTTP segments without using HTTP communication.

24. The non-transitory processor-readable medium of claim 23, wherein the client device comprises the segments buffer without an HTTP cache.

25. The non-transitory processor-readable medium of claim 22, wherein the associated URL information is used as an index for searching the segments buffer for a requested DASH segment.

26. The non-transitory processor-readable medium of claim 21, wherein the one or more DASH segments are stored in the segments buffer immediately after reconstruction.

27. The non-transitory processor-readable medium of claim 26, wherein the one or more DASH segments comprise multiple representations.

28. The non-transitory processor-readable medium of claim 27, wherein the multiple representations comprise at least one of different data rates or different levels of video quality.

29. The non-transitory processor-readable medium of claim 28, wherein the method further comprises:
at the client device:
determining that a requested DASH segment for a particular representation having a desired level of video quality is not found in the segments buffer; and
modifying the associated URL information and searching for another representation of the requested DASH segment having a next lower level of video quality.

30. The non-transitory processor-readable medium of claim 21, wherein the client device is a smart television device or a mobile computing device.

* * * * *